(12) United States Patent
Weaver

(10) Patent No.: US 7,485,835 B2
(45) Date of Patent: Feb. 3, 2009

(54) IMAGING SYSTEM HAVING A PLURALITY OF VORTEX LENSES

(75) Inventor: Thomas L. Weaver, Webster Groves, MO (US)

(73) Assignee: The Boeing Company, Chicago, IL (US)

( * ) Notice: Subject to any disclaimer, the term of this patent is extended or adjusted under 35 U.S.C. 154(b) by 41 days.

(21) Appl. No.: 11/613,431

(22) Filed: Dec. 20, 2006

(65) Prior Publication Data

US 2008/0149813 A1 Jun. 26, 2008

(51) Int. Cl.
*H01J 3/14* (2006.01)
(52) U.S. Cl. .................... 250/208.1; 250/216; 359/558
(58) Field of Classification Search ............. 250/208.1, 250/216; 359/1, 19, 558, 566
See application file for complete search history.

(56) References Cited

U.S. PATENT DOCUMENTS

2006/0065640 A1* 3/2006 Lizotte et al. .......... 219/121.61

OTHER PUBLICATIONS

Han, Hongtao, et al., "Integration of Micro-optics with a Fiber Array Connector using Passive Alignment Technique for Parallel Optics Applications", 2004 Electronic Components and Technology Conference, pp. 1012-1015.*
Swartzlander Jr., Grover, "The Optical Vortex Lens", OPN Nov. 2006, pp. 39-43.*

* cited by examiner

*Primary Examiner*—Kevin Pyo
(74) *Attorney, Agent, or Firm*—Klein, O'Neill & Singh, LLP

(57) ABSTRACT

An imaging system is provided. An imaging system comprises a plurality of vortex lenses aligned to cover a field of view and produce multiple images of an area near a point source.

16 Claims, 5 Drawing Sheets

IMAGING SYSTEM HAVING A PLURALITY OF VORTEX LENSES

FIELD OF THE DISCLOSURE

This disclosure relates generally to imaging systems, and more particularly, to imaging systems for detecting moving objects in the presence of optical interference.

BACKGROUND

Moving objects use imaging systems to monitor their environment. Moving objects include aircrafts, spacecrafts, satellites, space shuttles, nano-satellites, international space station, free-flying satellites, trains, ships and others. For purposes of this disclosure, a spacecraft may include all moving objects.

A spacecraft monitors its environment using imaging systems. An imaging system typically includes imaging optics and an optical detector. The imaging optics accepts external optical inputs and presents those inputs to a detector system while maintaining a known spatial relationship among the data items in the inputs, a process known as producing an image. The detector system converts the optical image into some other form in which its information content can be processed. The detector system may include human (pilot or crew's) vision, arrays of optical-to-electrical converters, or a combination thereof. The optical detector processes the input and generates information for the navigational and threat-response systems of the vehicle. Any response (offensive or defensive) by a spacecraft depends on the visual input provided by the imaging systems Spacecraft are vulnerable to laser attacks. Laser beams are capable of saturating optical detectors in imaging systems, causing the machine equivalent of temporary blindness. The temporary blindness suffered by conventional imaging systems may lead to spatial disorientation or loss of situational awareness by the operating system or crew in unmanned and manned vehicles, respectively, causing loss of spacecraft and crew (if present).

Furthermore, conventional imaging optics form a highly diffracted image of a source of optical attack. The diffracted image "blinds" a much larger area of the optical detector than the theoretical area occupied on the detector by the image of the vehicle carrying the attacking laser. If the attacking vehicle could be assumed to not be moving, the location of the attacking vehicle would be in the center of the "blind" region. However, because the attacking vehicle will be moving, it could be anywhere in the large "blind" region, which makes it hard to accurately locate the source or an attack and mount an effective response.

Therefore, it is desirable to have an imaging system that can provide an accurate image of the region close to the source of a laser attack.

SUMMARY

In one embodiment an imaging system is provided. The imaging system comprises a plurality of vortex lenses aligned to cover a field of view and produce multiple images of an area near a point source.

In another embodiment, an imaging system is provided. The imaging system for a moving object comprises a plurality of imaging subsystems, each subsystem having vortex lens, wherein the imaging subsystems are aligned to cover a field of view and produce multiple images of an area near a point source.

This brief summary has been provided so that the nature of the disclosure may be understood quickly. A more complete understanding of the disclosure can be obtained by reference to the following detailed description of the preferred embodiments thereof in connection with the attached drawings.

BRIEF DESCRIPTION OF THE DRAWINGS

The foregoing features and other features of the present disclosure will now be described with reference to the drawings of a preferred embodiment. In the drawings, the same components have the same reference numerals. The illustrated embodiment is intended to illustrate, but not to limit the disclosure. The drawings include the following Figures.

DETAILED DESCRIPTION

In one embodiment, an imaging system for moving objects is provided. The imaging system produces a sharp image of an area surrounding the source of attack, even when the moving object is attacked by a laser beam.

To facilitate an understanding of the present disclosure, a general view of an imaging subsystem will be described. The specific structural components of the imaging subsystem and imaging system of the present disclosure will then be described with specific reference to the general structure of an imaging system.

Figure 1A:
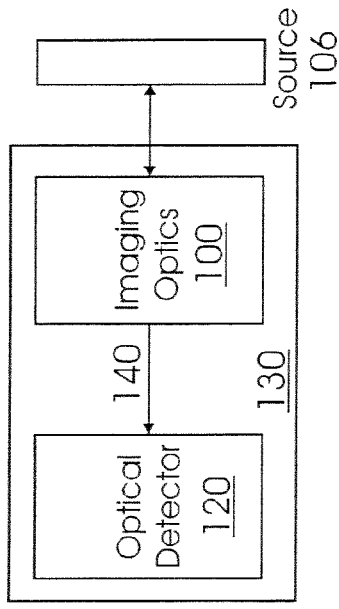
FIG. 1A shows a block diagram of an imaging subsystem collecting visual data from a source of attack.

FIG. 1A shows an imaging subsystem 130 that includes imaging optics 100 and an optical detector 120. The imaging optics 100 collects information from a source of attack (106) and provides visual data 140 to optical detector 120. Optical detector 120 processes visual data 140 and generates information for the spacecraft (not shown).

Figure 1B:
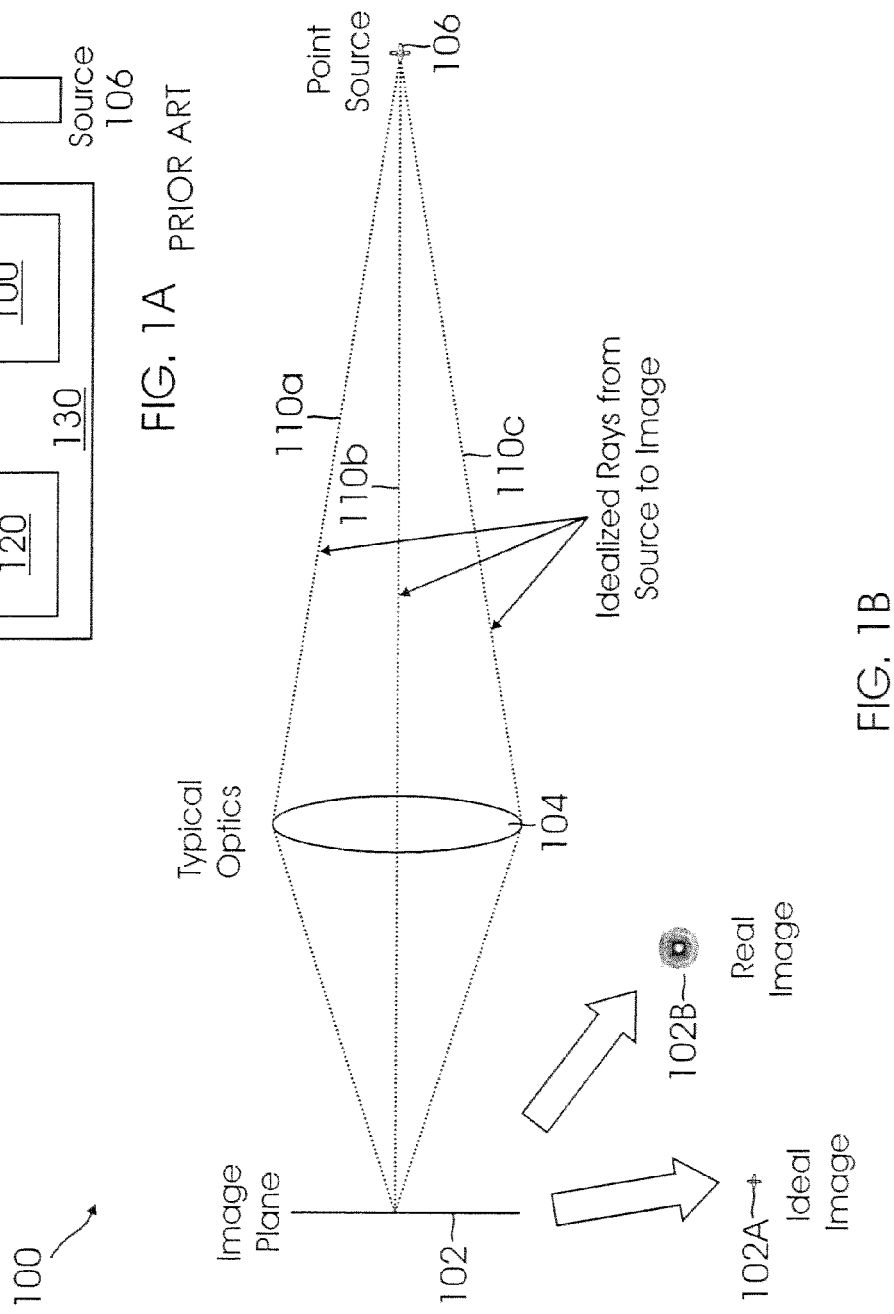
FIG. 1B shows an imaging subsystem with an imager on the same axis as the source of attack.
Figure 1C:
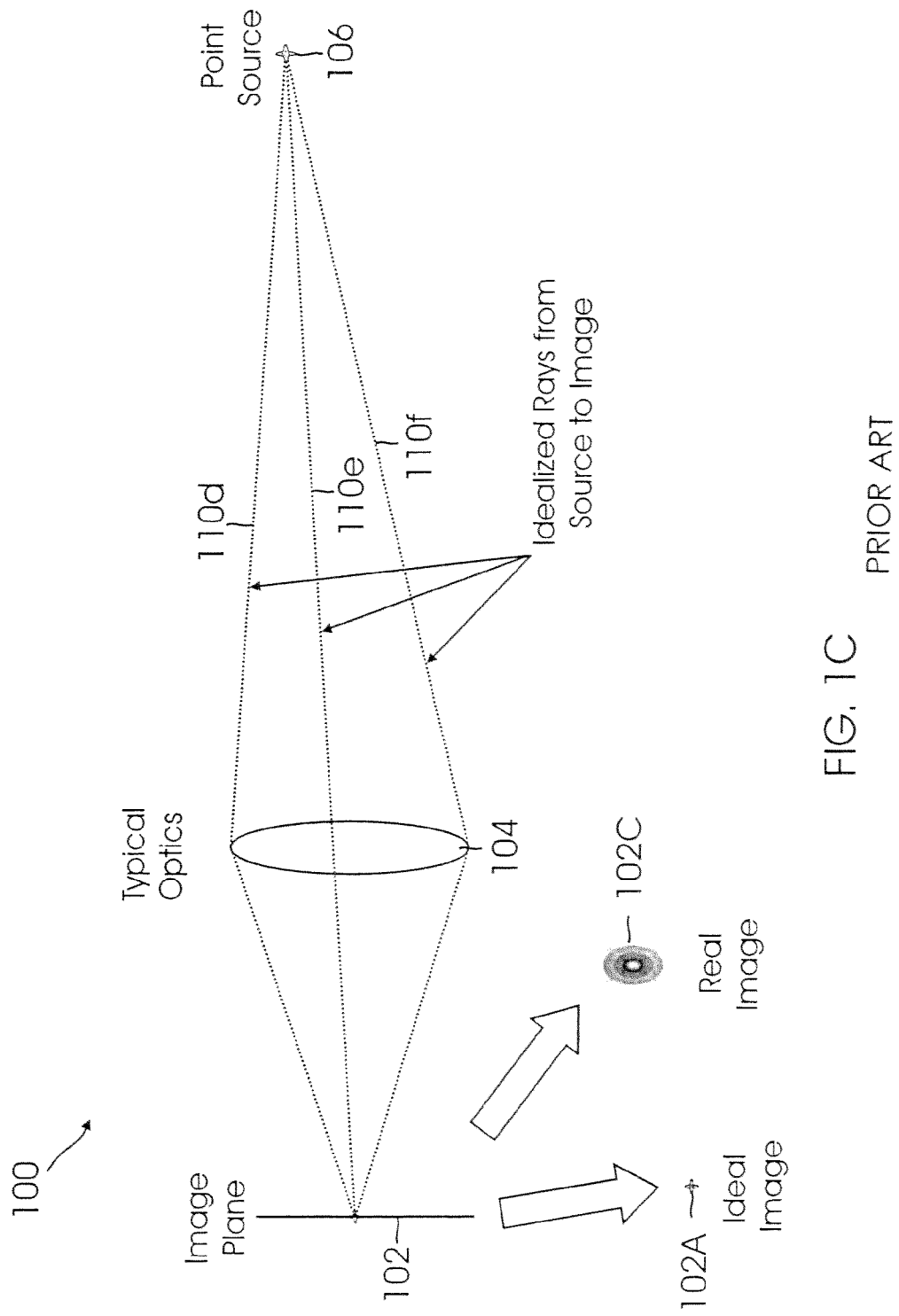
FIG. 1C shows an imaging subsystem with an off-axis imager.

FIG. 1B shows a conventional imaging optics 100 and a source 106 of attack. Source of attack 106 is a system or vehicle from where a laser attack occurs. Source of attack 106 is hereinafter referred to as "point source" 106.

Figure 1D:
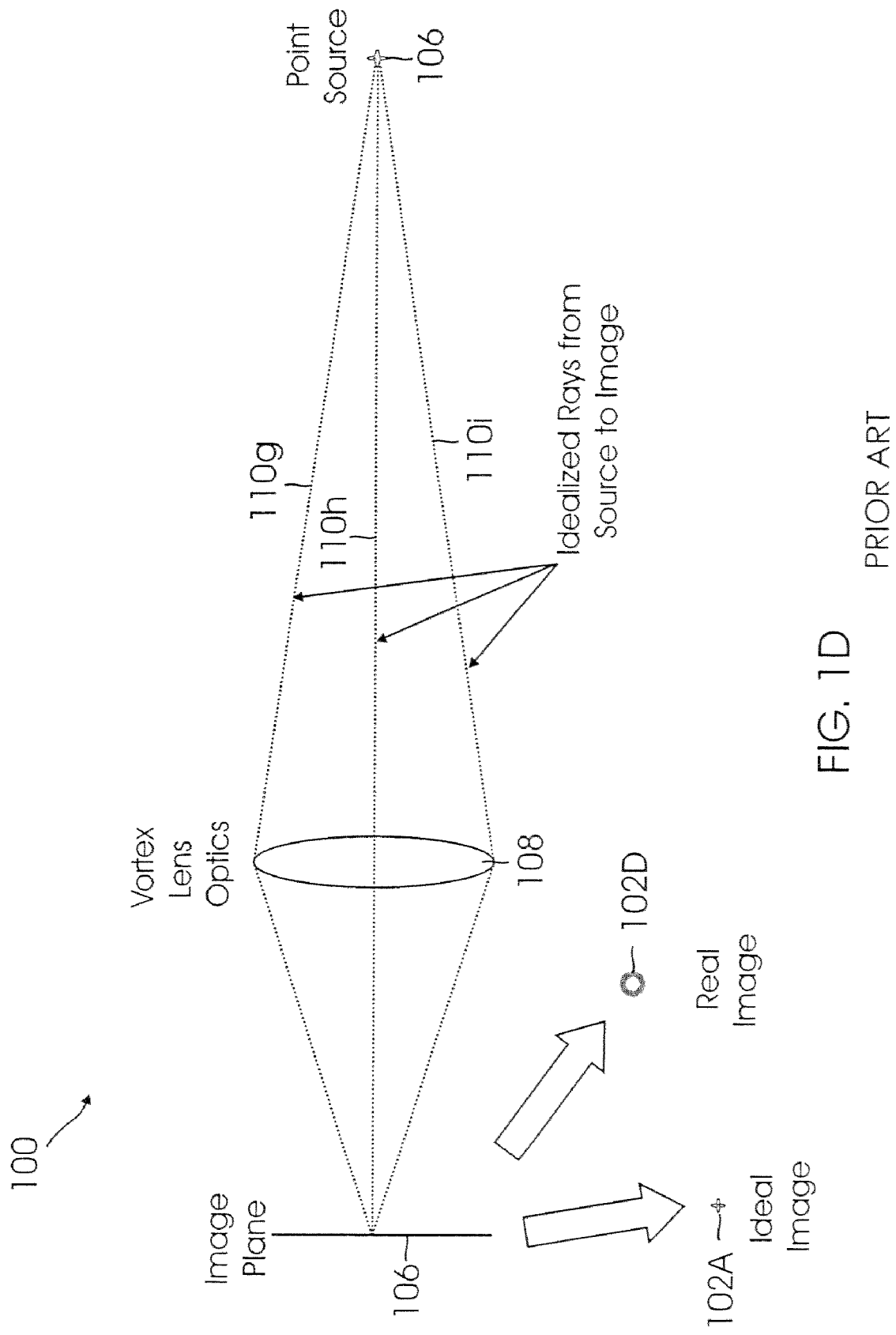
FIG. 1D shows an imaging subsystem using a vortex lens, which is on the same axis as a source of attack.

Imaging optics 100 includes an images (or lens) 104 and an image plane 102, which is the location of the optical detector 120. An imager is generally a glass refractive lens or a vortex lens (FIG. 1D). Image plane 102 may have a CMOS array or a CCD array, or similar array of optical-to-electronic converters aligned to receive an image from imager 304.

In case of a laser attack, point source 106 emits rays (110a-110c) which are incident on imager 104. In FIG. 1B, imager 104 is aligned on the same axis as the point source 106. In a conventional system, incident rays (110a-110c) from the point source 106 suffer diffraction and form a diffracted image 102B of the point source, instead of a desirable sharper (or ideal) image 102A.

FIG. 1 shows imager 104 as being off-axis from point source 106. Incident rays 110d-110f from point source 106 suffer diffraction and form a diffracted image 102C. Image 102C is relatively more distorted than image 102B (FIG. 1B).

Ideal image 102A (FIGS. 1B, 1C and 1D) of the point source 106 is similar in size and dimension to point source 106. An ideal image 102A, if formed, is a sharp image and provides accurate information about location of point source 106. However, in practice, at the image plane 102 the imager 104 forms real images 102B and 102C which, due to diffraction, are large, blurred images of point source 106. Large, blurred images (102B, 102C) make it difficult to provide exact location of point source 106.

For a better image, a vortex lens 108 may be used as an imager as shown in FIG. 1D. Information on structure and formation of a vortex lens 108 is available in the document, "Peering into Darkness with a Vortex Spatial Filter", by Grover A. Schwartzlander, Jr., published 15 Apr. 2001, in Volume 26, Number 8, of the journal "Optics Letters", incorporated herein by reference in its entirety.

Vortex lens 108 alters the phase of incident light (110g, 110h, 110i) and causes phase shifts. These phase shifts cause interference resulting in cancellation of light. Light cancellation may vary from 100% (at the center) to 0% at some distance from the center. Light cancellation reduces diffraction. Image 102D formed by vortex lens 108, is smaller and sharper than images 102B and 102C formed by glass lens 104.

Vortex lens 108 has a dark spot at the point of absolute (100%) cancellation, since no light passes through. This creates a spot where no image may be formed by the imaging system. Therefore, visual data provided by the imaging optics 100 only having a vortex lens as an imager is incomplete, which results in an incomplete view of the external environment.

Imaging systems of the present disclosure overcome problems of conventional imaging subsystems and provide a sharper image of a point source. Imaging systems of the present invention include a plurality of imaging subsystems, where each imaging subsystem is aligned to cover a field of view and produce an image of an area near a point source. Each imaging systems has vortex lens as an imager.

Figure 2A:
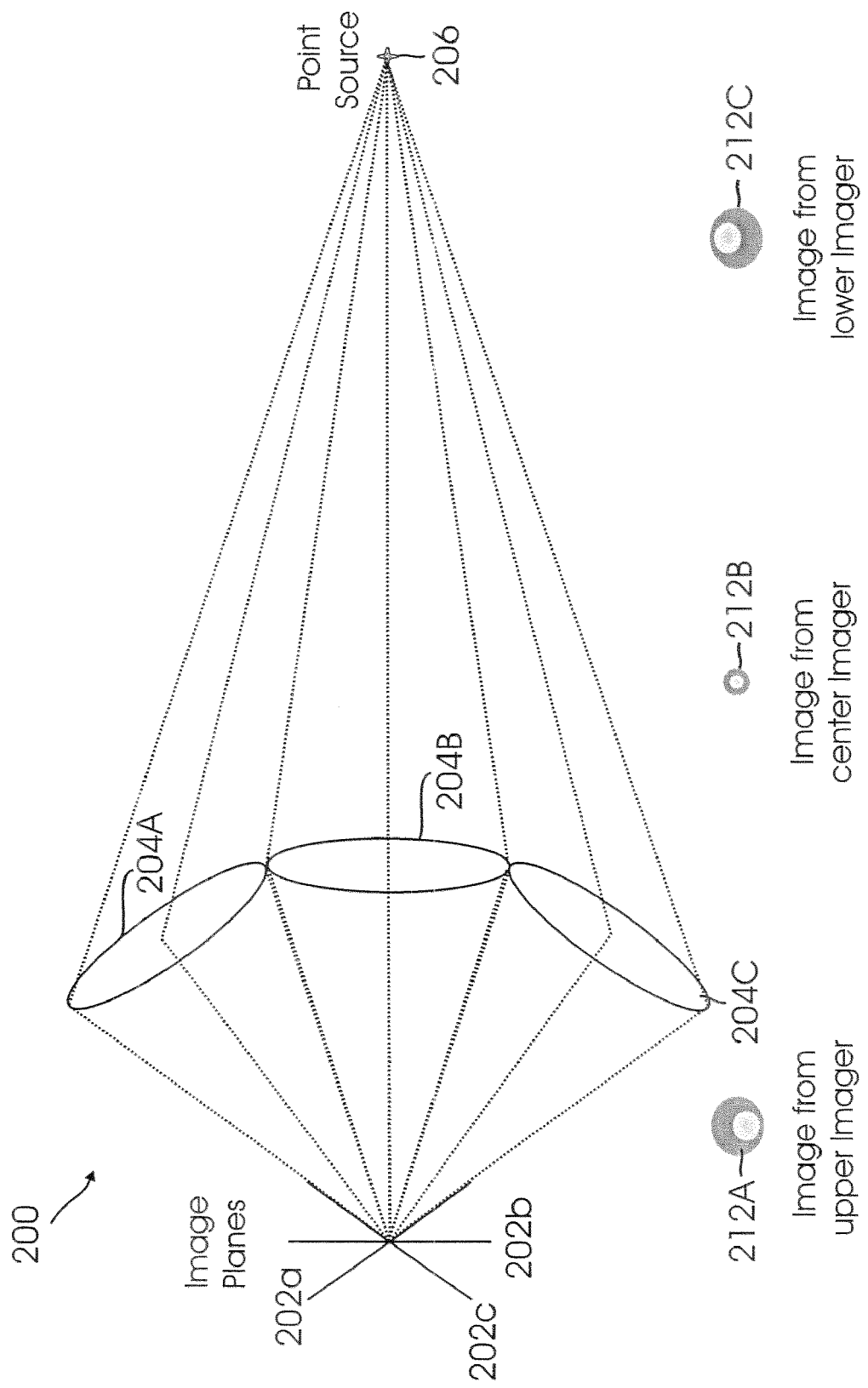
FIG. 2A shows an imaging system with a plurality of imagers, according to an embodiment.

FIG. 2A shows an imaging system 900 of the present disclosure that produces a sharper and continuous image of point source 206 (similar to 106) even when exposed to laser beams.

Imaging system 200 includes plural imaging subsystems having vortex lenses (imagers), for example, 204A, 204B, 204c. Vortex lenses 204A-204C of imaging subsystems are aligned at slightly different angles but overlapping portions of a field of view.

Incident light for point source 206 is recovered by each vortex lens 204A-204C. Image planes 202A-202C recover the light for lens 204A-204C. Each lens creates an image, for example, 212A (from lens 204A), 212B (from lens 204B) and 212 (from lens 204C). At least one of the lenses provides a sharp image, for example 212B.

During a laser attack, imagers (204A-204C) that are oriented off-axis from point source 206 have only some areas of their image planes (202A-202C) temporarily saturated because vortex lenses 204A-204C does not completely cancel improper axis (or off-axis) light. Therefore, unlike conventional subsystem 100, the imaging system 200 of an embodiment does not suffer temporary blindness and provides a continuous image of point source 206.

At least one of the imagers of imaging subsystems (in this case 204B) is on the same axis as the point source 206 and is able to form an acceptable image (in this case 212B) which has minimal diffraction. A relatively sharp image of the point source 206 is formed which provides an accurate estimate of the location of point source 206.

It is within the scope of the present disclosure to use more than three vortex lenses to form imaging system 200. The number of imaging subsystems depends on the field of view that the imaging system is designed to cover.

Figure 2B:
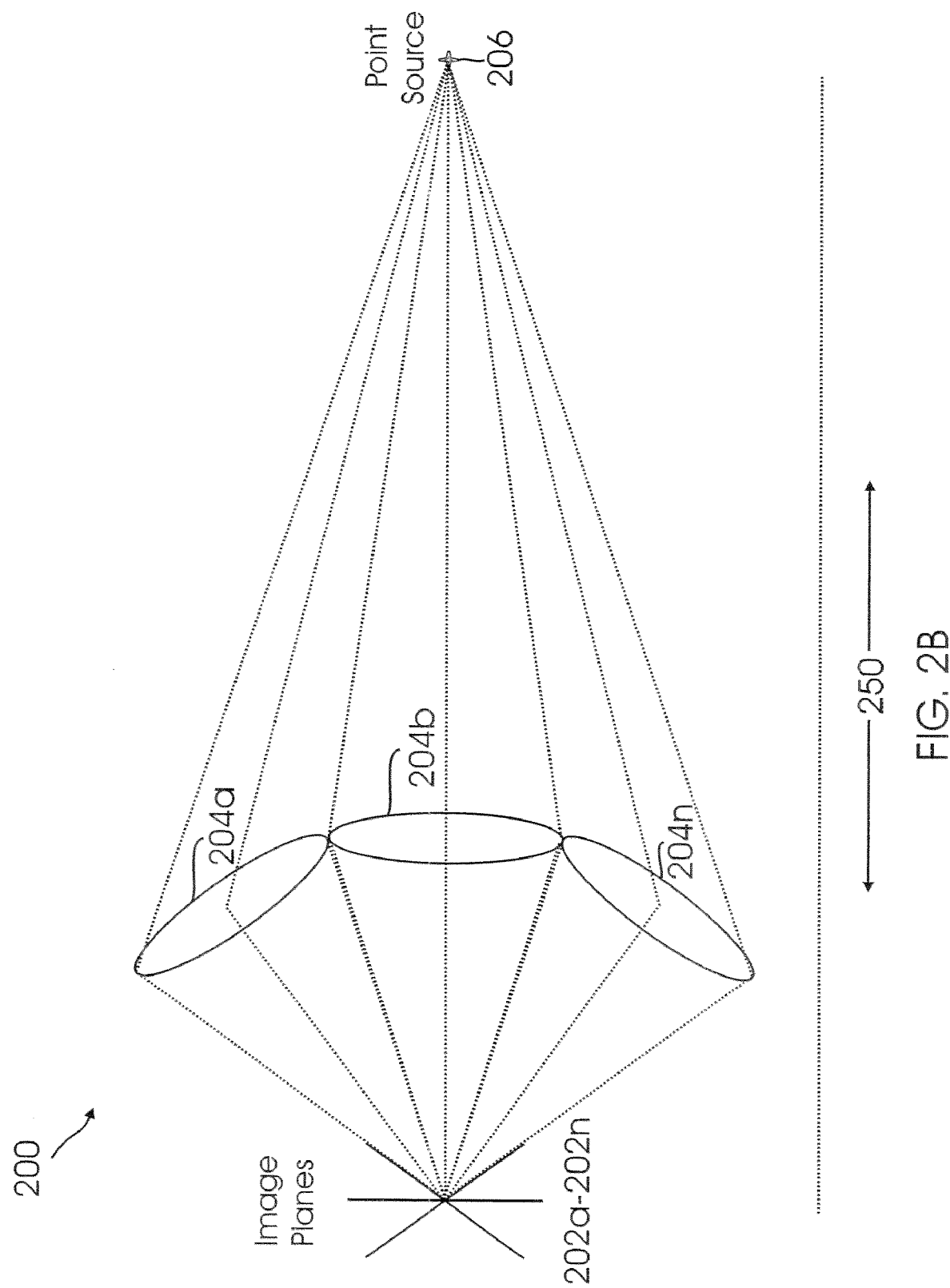
FIG. 2B shows a field of view covered by the imaging system, of an embodiment.

FIG. 2B shows that plural vortex lens (204A-204N) may be used with plural image planes 102A-202N. The field of view for system 200 is shown as 250. The number of lenses used depends on the desired field of view 250.

The imaging system of the present disclosure, provide a sharp image of the area around a point source during a laser attack. Furthermore, the imaging system of the present disclosure provides a better field of view than conventional systems and provides a sharper image of an off-axis point source.

Although the present disclosure has been described with reference to specific embodiments, these embodiments are illustrative only and not limiting. Many other applications and embodiments of the present disclosure will be apparent in light of this disclosure and the following claims.

What is claimed is:

1. An imaging system, comprising:
a plurality of vortex lenses aligned to cover a field of view and produce multiple images of an area near a point source; wherein at least one of the plurality of vortex lenses is on a same axis as the point source, wherein the plurality of vortex lenses have overlapping portions of the field of view; and wherein one or more of the plurality of vortex lenses form an accurate image of the point source with minimal diffraction.

2. The imaging system of claim 1, wherein the plurality of vortex lenses are each aligned at different angles.

3. The imaging system of claim 1, wherein the field of view determines a number of vortex lenses.

4. The imaging system of claim 1, wherein each of the plurality of vortex lens form an image of the point source on an image plane.

5. The imaging system of claim 4, wherein the image plane is a CMOS array or CCD array, or similar array of optical-to-electronic converters aligned to receive image from the vortex lenses.

6. The imaging system of claim 1, wherein the imaging system is a moving object.

7. The imaging system of claim 6, wherein the moving object is a spacecraft, an aircraft, a satellite or a ground vehicle such as a train or truck.

8. An imaging system for a moving object, comprising
a plurality of imaging subsystems, each subsystem having vortex lens; wherein the imaging subsystems are aligned to cover a field of view and produce multiple images of an area near a point source; and wherein at least one of the imaging subsystems having vortex lens is on a same axis as the point source, wherein the plurality of imaging subsystems have overlapping portions of the field of view; and wherein one or more of the plurality of imaging subsystems form an accurate image of the point source with minimal diffraction.

9. The imaging system of claim 8, wherein each imaging subsystem includes a vortex lens for producing an image of an area near a point source.

10. The imaging system of claim 8, wherein the imaging system has vortex lenses each aligned at different angles.

11. The imaging system of claim 8, wherein the field of view determines the number of vortex lenses used.

12. The imaging system of claim 8, wherein the vortex lenses form images of the joint source on multiple image planes.

13. The imaging system of claim 12, wherein the image planes are CMOS arrays, CCD arrays, or other similar arrays of optical-to-electrical converters aligned to receive image from the vortex lenses.

14. The imaging system of claim 8, wherein the imaging system is used for moving objects.

15. The imaging system of claim 14, wherein the moving object is a spacecraft, an aircraft, a satellite or a ground vehicle such as a train or truck.

16. The imaging system of claim 8, wherein each of the plurality of vortex lens forms an image of the point source on an image plane.

* * * * *